Nov. 8, 1960
C. A. NAUMANN
2,959,199
COMBINATION SQUARE AND SAW GUIDE
Filed June 23, 1958
2 Sheets-Sheet 1
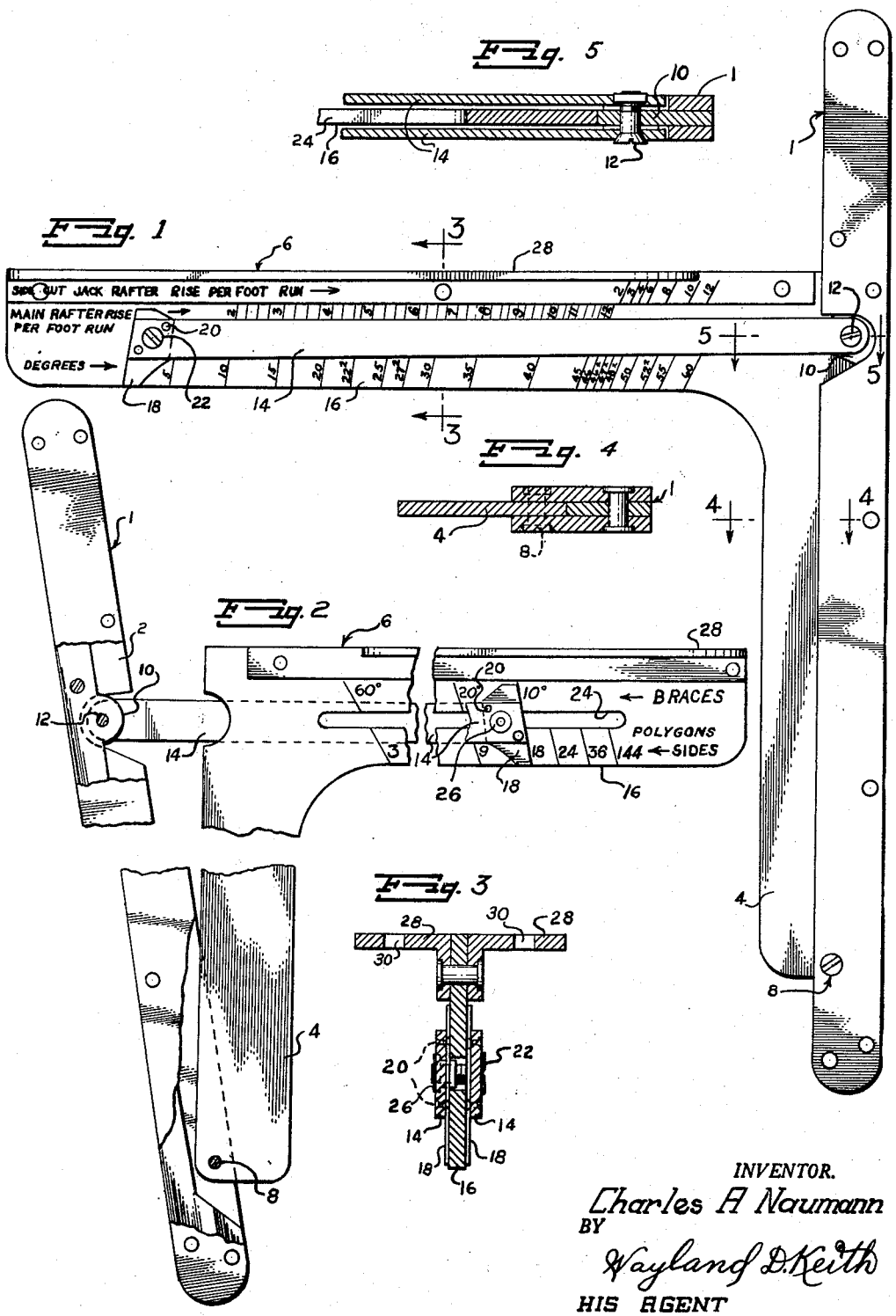
INVENTOR.
Charles A Naumann
BY
Wayland D. Keith
HIS AGENT Nov. 8, 1960 C. A. NAUMANN 2,959,199
COMBINATION SQUARE AND SAW GUIDE
Filed June 23, 1958 2 Sheets-Sheet 2
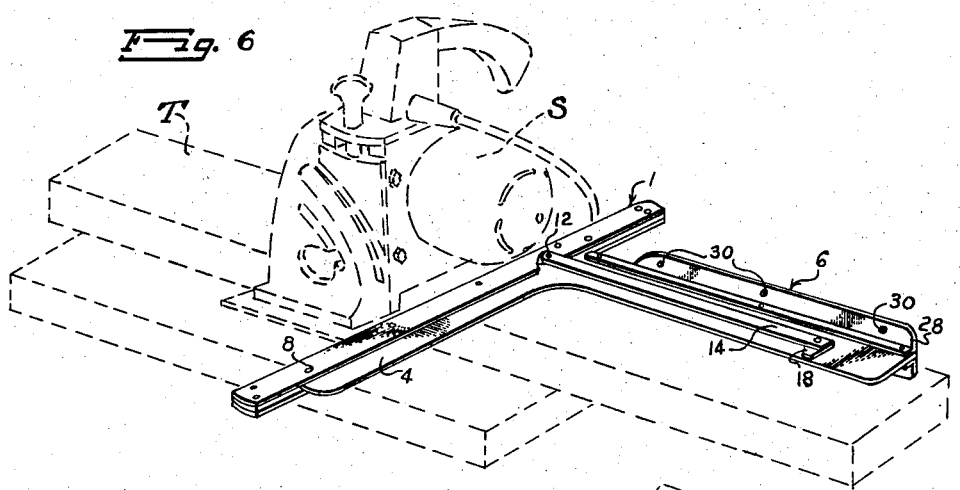
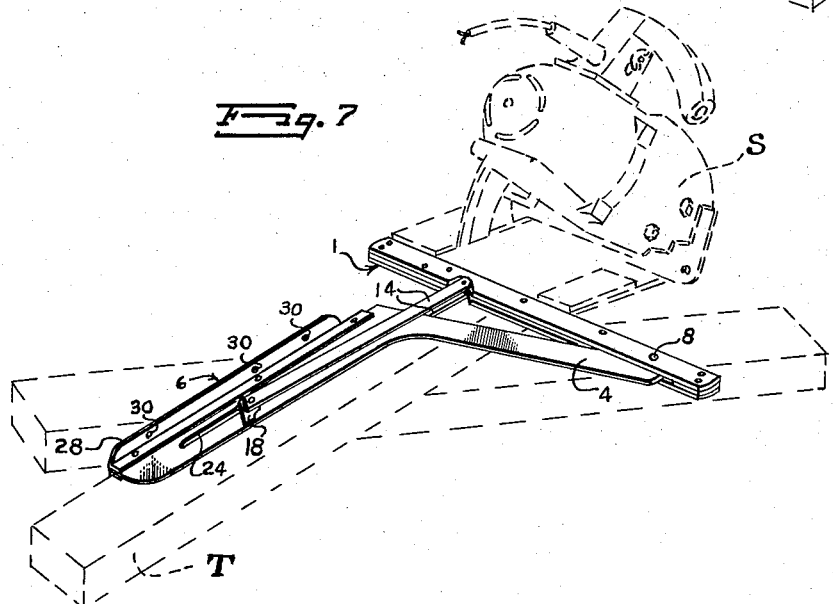
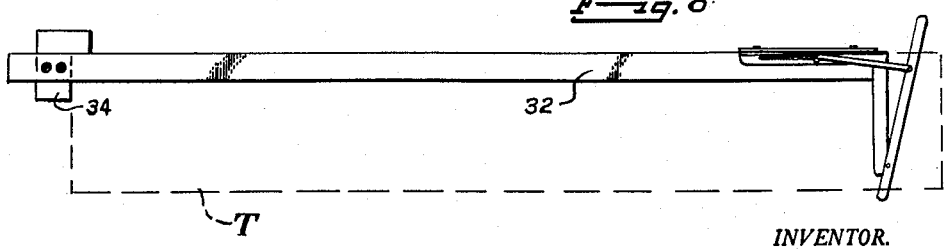
INVENTOR.
Charles A. Naumann
BY
Wayland D. Keith
HIS AGENT

United States Patent Office 2,959,199
Patented Nov. 8, 1960

2,959,199

COMBINATION SQUARE AND SAW GUIDE

Charles A. Naumann, 2206 Fillmore St.,
Wichita Falls, Tex.

Filed June 23, 1958, Ser. No. 743,848

1 Claim. (Cl. 143—6)

This invention relates to improvements in a combination square and saw guide, and more particularly to a combination square and saw guide having a movable guide arm whereby the arm may be set at a preselected angle with respect to the saw guide and the arm selectively locked in place at a predetermined angle, which angle setting and the functions thereof are directly readable on the square, and whereby the arm may be used for directly guiding a saw, such as an electric handsaw, for cutting timbers without the necessity of employing two steps, that is the marking off of the timber and then accordingly sawing the timber, but the present device enables sawing operation on timbers, without precalculated laying out, thereby greatly expediting the work.

Heretofore, it has been standard practice for an artisan, such as a carpenter, cabinet makers, and the like, to use what is known as a "steel square," whereon various indicia was imprinted on the blade and tongue thereof, to enable those skilled in the art of reading the steel square, to lay out timbers, and various other materials, preparatory to cutting the timbers or other materials.

The present device employs various indicia thereon, which enables the correct setting of a movable arm on the combination square and saw guide, so that a cut may be readily made with an electric handsaw, without the necessity of laying out the work, preparatory to sawing it with an electric hand saw or the like. While the indicia, which is imprinted on the present scale, is merely indicative of the character of indicia that may be used, it is to be understood that each craft might employ indicia specific to the particular trade in which he works, and while the present device is more or less directed to markings which would be used by a carpenter, in the building trades, the whole theory of the setting of the square is based upon degrees of angle. However, for the sake of brevity, an illustrative rafter scale is shown on one side of the square, together with various degree settings, and a polygon scale is shown on the opposite side, together with scales for the cutting of angle braces, thereby enabling a direct setting of the movable arm and the securing of same to the square for a specific cutting operation, to enable the cut to be made directly therefrom, without having a lay out the job and to subsequently make the cuts on the material.

An object of this invention is to provide a square arrangement, the movable arm of which may be set at a desired angle and secured in place to enable successive pieces of material to be cut by means of an electric handsaw or the like, without the necessity of laying out the particular angles.

Another object of the invention is to provide a combination angle square and saw guide, the movable saw guide member and the angle square of which may be set on a particular rafter rise indicia, and locked in place to enable all rafters, which are to be that particular cut, to be sawed with an electric handsaw, without the necessity of laying out the work.

Still another object of the invention is to provide an angle square and saw guide arrangement whereby, the movable saw guide member of the square may be set at a particular angle to read directly on the member the number of sides of a polygon and whereby all angular cuts made without laying these out, so that the polygon side segments will be exactly and similarly cut so as to match in close fitting relation.

Another object of the invention is to provide, on a combination angle square and saw guide, brace indicia settings to enable braces to be cut directly, with an electric handsaw without the necessity of computing and laying out these cuts.

With these objects in mind and others which will become manifest as the description proceeds, reference is to be had to the accompanying drawings, in which like reference characters designate like parts in the several views thereof, in which:

Fig. 1 is an elevational view of the square in closed position, showing a plurality of indicia imprinted thereon, including the rise per foot of run of main rafters and jack rafters, and certain degree indicia for angular settings of the movable arm;

Fig. 2 is a fragmentary elevational view of the opposite side of the device from that shown in Fig. 1, and showing the square in an angular position, with parts broken away and shortened, and with parts shown in section to show the details of construction, and also showing other scales for polygons and braces;

Fig. 3 is an enlarged sectional view taken on the line 3—3 of Fig. 1, looking in the direction indicated by the arrows;

Fig. 4 is an enlarged sectional view taken on the line 4—4 of Fig. 1, looking in the direction indicated by the arrows;

Fig. 5 is an enlarged sectional view taken on the line 5—5 of Fig. 1, looking in the direction indicated by the arrows;

Fig. 6 is a perspective view of a combination square and saw guide, showing the saw as being used in connection with the square and saw guide for making a right angle cut on a timber, the timber and saw being shown in dashed outline and the saw guide and square being shown in full outline;

Fig. 7 is a perspective view of an electric saw and the combination square and saw guide being used to make a compound angle cut, such as a hip rafter, or the like, and showing the saw and the rafter in dashed outline; and Fig. 8 shows the combination square and saw guide attached to a saw guide bar to enable multiple cuts of a given length to be readily duplicated without the necessity of measuring and laying out each individual piece.

The present device is particularly adaptable for use in such industries as the building trades, where many pieces of timber or other material are required to be cut at the same angle, and it is particularly adaptable where the materials being cut have the same angle and the same length, as once the combination square and saw guide is set and attached to a guide bar, the timbers may be readily and accurately cut by anyone who can use an electric handsaw, even though not an experienced artisan. Furthermore, the simplicity of setting the particular combination square and saw guide to the exact length and angle cut, enables anyone, of average intelligence, to readily cut rafters and to make other complex cuts, which formerly required technical computation and layout work by a skilled artisan.

The device, as shown and described herein, is preferably made of aluminium, magnesium, plastic, steel or other thin section metal or the like. Such material presents an instrument which is light in weight, and which may be readily used and handled, and which obviates the use of two or more instruments to perform the present operation.

The present instrument is of such construction that it may readily be placed on a timber, and the blade so arranged that it will guide the blade of an electric saw through the timber, to enable a finished angle to be made on the timber, without resetting the tool or requiring further extended guiding of the blade to enable the timber to be completely severed.

While the present device is shown to be assembled of structural members, such as flates and angles, it is to be understood that the component parts of the device may be readily moulded and assembled into a composite unit, without departing from the spirit of the invention, or the scope of the appended claims.

With more detailed reference to the drawing, the numeral 1 designated generally the saw guide member which has a recess 2 formed therein for at least a portion of the length thereof, to receive a portion 4 of the square-blade, designated generally at 6. The saw guide 1 is pivoted by a pin 8 to the square-blade portion 4 near one end of the portion 4, as will best be seen in Fig. 2. The saw guide 1 has a lug 10 intermediate the length thereof, which lug is apertured to receive a pin 12 therethrough. A pair of bars 14 is pivotally connected to lug 10 by means of the pin 12, which bars extend along blade 16 of a square-blade 6. The outer end of each bar 14 has a pointer 18 thereon, each pointer being secured in place by rivets 20. Each of the bars 14 and pointers 18 are apertured to receive a screw 22 therethrough and through a slot 24 within blade 16. A threaded nut 26, or the like, is secured to one of the bars 14 so that the screw 22 may be tightened to bindingly engage pointers 18 with the blade 16 of the square blade. The outer end of each pointer 18 is adapted to read on indicia lines, so as to enable the exact determination of the angle setting of the saw guide 1 with respect to the blade 16 of the square blade. Once the setting is determined, the screw 22 is tightened, which will maintain the guide 1 in a fixed relation with respect to the blade 16.

When the saw guide 1 is in closed position, as shown in Fig. 1, the guide member 1 is at right angles to the blade 16 and the timbers may be readily and accurately cut at that angle by an electric handsaw. However, upon loosening the screw 22, the saw guide 1 may be pivotally moved about pin 8, until the desired angle, with respect to the blade 16, is obtained, then the screw 22 is tightened, as will best be seen in Fig. 2. The combination saw guide and angle square is shown to be laid off for a maximum of 60 degrees of cut with respect to the blade 16. However, by reversal of the instrument, any degree cut can be made on the timber.

The blade 16 has an outstanding rib 28 on each side thereof to form an abutment with the face of the timber being cut, so as to maintain the saw guide 1 in the correct angular relation with respect thereto. Furthermore, the outstanding ribs 28 have holes 30 formed therethrough, which enables the attachment thereof to a guide bar 32, as shown in Fig. 8, which enables multiple cutting of similar length pieces of timber or the like. A stop 34 may be provided to abut against the end of the timber being cut, to enable multiple pieces to be cut by inexperienced operators. The stop may be secured to guide bar 32 in a number of ways, for instance, by clamping, nailing or the like, to enable multiple lengths to be readily cut, and yet enable quickly changing the setting of the guide for another length, when desired.

On the opposite side of the square blade 16, from that showing the indicia of the rafter cuts and degrees, is a calibration designating the particular angle at which to set the saw guide member 1, so when cuts are made at this angle, and members of equal length fitted together, a polygon will be produced which will have the particular number of sides with which the pointer 18 is in register. By tightening screw 22, which threadably engages nut 26, the pointer elements 18, on opposite sides of blade 16, will be held in engagement with the blade 16, thereby holding the saw guide member 1 in secure, fixed relation with respect to blade 16.

The indicia is shown as indicating cuts for polygons from three to one hundred forty-four sides, the indicia for certain intermediate polygons having been omitted for the sake of clarity.

It is to be understood, however, that indicia for a polygon with any number of sides, from three to infinity can be inscribed on the blade 16, which will enable workmen to set the device at a particular setting without the necessity for calculation and all cuts may be made directly to the timber or other material being cut, with a minimum of human error.

Preferably on the same side of the blade on which the indicia for cutting polygons appears, is indicia for the cutting of braces, which for the sake of clarity, has been indicated in only six settings, although any number of indicia, for various settings, can be made, which enables the direct reading of the cut of the brace, so as to give the cut which will fit a vertical standard, without the necessity of the worker having the mathematical background to calculate these angles. This indicia is indicated as "braces" and the degree of angularity of the brace indicia is read is with respect to the horizontal, in case of a vertical structure. The indicia, as indicated on the blade of the combination square and saw guide is not the actual degree of the cut, but a complementary angle of the indicia being read which the braces assume with respect to the horizontal, therefore the cut is supplementary with respect to the vertical for a vertical structure. The angle of the cut of timber plus the degree of angle with respect to the standard being braced is a straight angle, therefore, if the indicia indicated 30 degrees with respect to the horizontal, for the brace, the degree of the obtuse angle cut would be 150 degrees, when reckoned with respect to the standard being braced.

This particular combination saw guide and square, as described above, may be used with any type of electric handsaw, whether a rotary saw S, as shown in Figs. 6 and 7, or a reciprocating type saw, which is known as a saber-tooth, or the like.

*Operation*

With the rise of the rafter being known, and with the type of rafter required being known, such as a jack rafter, main rafter, or the like, the screw 22 is loosened, which will enable the saw guide member 1 to move outward at an angle relative to blade portion 4, until the pointer registers with the particular rise or degree at which the cut is to be made, in the case of a main rafter, if the rise is five on twelve, the screw may be tightened, and then the rafters cut the desired length at this angle. With the length being known, the stop 34 on guide bar 32 may be set to the correct length and the entire number of rafters for the job, may be cut quickly, accurately and precisely at a single setting of the tool.

When it is desired to change to other settings, or to change the saw to a different degree of angle, to enable a compound cut to be made, such as on a hip rafter, jack rafter, or the like, this can be readily done, as shown in Fig. 7.

The opposite side of the square from that showing the indicia for cutting rafters, shows indicia for cutting polygons, braces, and the like, as representative of the utilization of the indicia printed directly on the combination square and saw guide. By setting the pointer on eight, the indicia for an octagon, the guide will automatically give the correct cut, so when the correct number of equal length sides are cut and fitted together they will form a polygon with eight sides, that is, if it is desired to form an octagon, the pointer is set on the line indicating eight, and the length of the side determined, the saw guide member will automatically give the correct angle, when sawed and fitted together, to give the octagon. A scale is shown for 22.5 degree, 30 degree and 45 degree braces, which enables the framing of towers and the like, without having to make calculations, as would be necessitated by the use of a steel square, and while only three "brace" settings are shown, it is to be understood that any number may be inscribed on the blade 16.

The cuts and settings described above are representative of a number of applications to which the tool may be put, and since the degree of angularity of the saw guide member 1 with respect to the square blade 16 is the determining factor, any indicia that follows this pattern may be imprinted thereon to enable the use of the square in any field of science and crafts to which it may be applicable.

Having thus clearly shown and described the invention, what is claimed as new and desired to be secured by Letters Patent is:

A combination square and saw guide for use with a portable, power driven, circle saw comprising; a first blade and a second blade, which blades are integrally connected to form a right angle, a rigid out-turned flange along the length of each lateral side of said first blade, a saw guide member pivotally connected to the distal end of said second blade, the axis of which pivot is perpendicular to the face of said second blade, a pair of bars pivotally connected to said saw guide member intermediate the length thereof so said pair of bars will be in parallel relation with said first blade when said bars are in one position, one of said bars being on each side of said first blade, said first blade having a longitudinal slot formed therein, each bar of said pair of bars being apertured near the end thereof opposite said pivot, an adjustment screw passing through said apertures in said bars and through said longitudinal slot and being adapted to bindingly engage said bars with said first blade; indicia imprinted on each side of said first blade and being adjacent said longitudinal slot, a straight edge indicator member secured to an end of each of said bars adjacent said adjustment screw, which straight edge indicator members are adapted to be selectively moved into register with certain of said indicia on said first blade to determine the relative position of said saw guide member with respect to said first blade.

References Cited in the file of this patent

UNITED STATES PATENTS

| | | |
|---|---|---|
| 150,339 | McKee | Apr. 28, 1874 |
| 486,186 | Thornton | Nov. 15, 1892 |
| 1,056,917 | Len | Mar. 25, 1913 |
| 1,442,265 | Grandle | Jan. 16, 1923 |
| 1,911,045 | Tinnen | May 23, 1933 |
| 2,625,184 | Harbert | Jan. 13, 1953 |
| 2,651,333 | Spinney | Sept. 8, 1953 |